United States Patent [19]

Adell

[11] Patent Number: 4,573,288

[45] Date of Patent: Mar. 4, 1986

[54] MAGNETIC DOOR EDGE GUARD

[75] Inventor: Robert Adell, Sunnyvale, Tex.

[73] Assignee: U.S. Product Development Company, Sunnyvale, Tex.

[21] Appl. No.: 648,426

[22] Filed: Sep. 7, 1984

[51] Int. Cl.$^4$ ............................................... E05F 7/00
[52] U.S. Cl. .......................................... 49/462; 52/716
[58] Field of Search ...................... 49/462, 460, 478; 52/716, 717, 718

[56] References Cited

U.S. PATENT DOCUMENTS

| | | | |
|---|---|---|---|
| 2,928,145 | 3/1960 | Foley | 49/478 |
| 3,111,728 | 11/1963 | Alderfer | 49/478 |
| 3,147,176 | 9/1964 | Haslam | 49/460 X |
| 3,472,546 | 10/1969 | Samuels | 49/460 X |
| 3,494,075 | 2/1970 | Kunevicius | 49/462 |
| 3,641,707 | 2/1972 | Kellos | 49/462 |

Primary Examiner—Philip C. Kannan
Attorney, Agent, or Firm—Stephenson and Boller

[57] ABSTRACT

A magnetic door edge guard for the trailing edge of a swinging metal closure such as an automobile door comprises an elongate non-metallic body of generally U-shaped cross section which contains a plurality of permanently magnetized elements for attaching the edge guard magnetically to the trailing edge of the swinging metal closure. In one embodiment the permanently magnetized elements comprise wires extending lengthwise of the non-metallic body. In another embodiment the permanently magnetized elements comprise metal fragments distributed throughout the extent of the non-metallic body.

7 Claims, 4 Drawing Figures

MAGNETIC DOOR EDGE GUARD

BACKGROUND AND SUMMARY OF THE INVENTION

This invention relates to edge guards and specifically it relates to an edge guard which is adapted for fitting onto the trailing edge of a swinging closure such as a door edge in an automobile.

Edge guards of the general type to which the present invention relates are disclosed in a number of applicant's issued U.S. patents such as U.S. Pat. Nos. 4,259,812, 4,338,148, 4,379,376, 4,316,348, 4,365,450, 4,369,377, 4,334,700, 4,377,056, 4,387,125.

There are also a number of applicant's pending patent applications relating to this general subject which are known to the Patent Office by virtue of their pendency.

When applied to the trailing edge of a swinging closure such as an automobile door, an edge guard provides a protective function guarding the door edge from damage when the door is swung open against an object in the path of travel of the swinging door's edge.

In the usual automobile door construction the trailing edge comprises marginal portions of inner and outer sheet metal door panels wrapped together and welded. This is commonly referred to as a hem flange. While the automobile door is painted, the edge is subject to chipping, marring and attendant adverse effects such as rusting and corrosion. Without door edge guards to provide protection these effects can lead to unsightly appearance and loss of value for an automobile.

It is also desirable that the edge guards provide an attractive decorative appearance since a portion of the edge guard on the outside of the door edge will be visible when the automobile is viewed from the side. Depending upon styling considerations the door edge guard may be a bright metal or it may be color-coordinated with the painted color of the automobile.

Applicant's inventions are also directed toward both bright metal door edge guards as well as color-coordinated door edge guards. In this regard, bright metal door edge guards may be constructed from any suitable metal, stainless steel, or bi-metal for example, and provided with a protective insulation so that the possibility of electrochemical action occurring between the metal of the edge guard and the metal of the door is minimized. In other words, such insulation is intended to guard against rusting. Applicant has also pointed out the desirability of having door edge guards self-retaining.

Other of applicant's inventions relate to solely non-metallic door edge guards which can also provide protective and decorative functions without the use of a self-retaining metal channel. Such edge guards, which are typically plastic, can be directly colored with a suitable coloring so that the finished product has the desired color.

The present invention may be generally considered as a self-retaining edge guard. In other words the edge guard forcefully retains itself, and does so through the use of magnetized material.

One advantage of the invention is that a given design of door edge guard can stand a wider tolerance in the door hem flange thickness, yet still be readily and securely installed, and provide the desired protective function.

The present invention has many attributes including the tendency to resist rusting, thereby promoting a long attractive appearance, providing a protective function for the door edge against paint chipping, marring, scuffing, etc., and it can be color-coordinated with the color of an automobile.

The foregoing features, advantages, and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

DESCRIPTION OF THE PREFERRED EMBODIMENT

Figure 1:
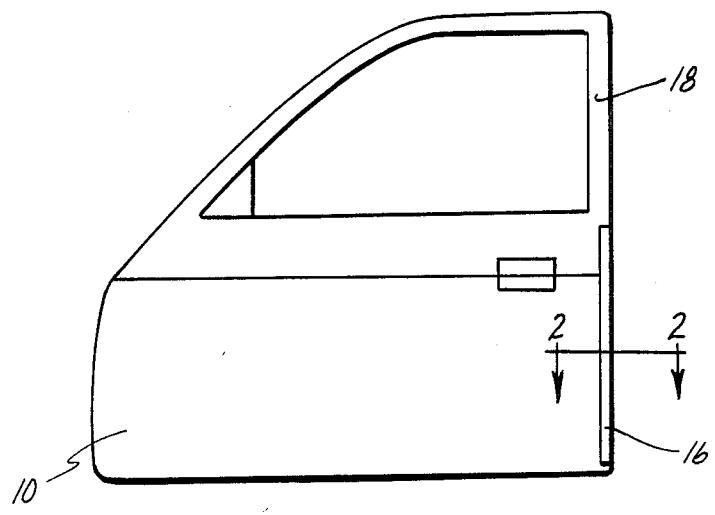
FIG. 1 is a side elevational view of an automobile door containing a door edge guard according to the present invention.
Figure 2:
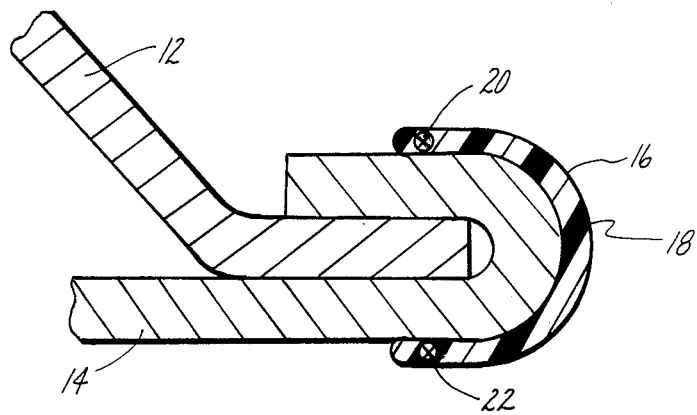
FIG. 2 is a fragmentary horizontal cross sectional view taken in the direction of arrows 2—2 in FIG. 1 and enlarged.

FIG. 1 illustrates an automobile door 10 which is representative of conventional automotive design. The door is fabricated from inner and outer stamped sheet metal panels 12 and 14 respectively. A marginal portion of the outer door panel 14 is wrapped around a marginal portion of the inner panel and the two panels are welded together at these marginal portions to form a hem flange such as shown in FIG. 2.

A door edge guard 16 fits onto the hem flange in the manner shown. The door edge guard serves to protect the painted door edge from damage which might otherwise occur when the door is swung open into the path of another object which may be present in the path of travel of the swinging door edge.

Edge guard 16 is shown to comprise in transverse cross section a general U-shape to fit with close conformity onto the trailing edge of the door. Reference to a U-shape is intended to include analogous shapes such as J, V, and C. The illustrated door is shown to include a window frame 18. The illustrated edge guard extends only part way up the trailing edge of the door and does not extend into the window frame area. It is possible, if desired, to make the edge guard of any desired length, either more or less than shown, for fitting onto the full length or any lesser amount of a trailing edge. In most conventional designs, the lower portion of the door is disposed laterally further outboard in the vehicle and therefore, a door edge guard usually extends only along that much of the door as shown by the example of FIG. 1.

The illustrated construction for edge guard 16 comprises a non-metallic body 18. For example, a suitable plastic material is appropriate for body 18 so as to enable the edge guard to be fabricated by extrusion, molding, or a like process. Polyvinyl chloride is a suitable material. It is also possible to color the material to color coordinate with the painted color of the door. This can be done by using plastic of suitable color.

Disposed within the non-metallic body 18 are a pair of wire rods 20 and 22, respectively. The wire rods are shown to be of circular cross section and have a diameter less than the thickness of the non-metallic material 18. As such, the wire rods may be considered as being fully embedded within the non-metallic material. Rod 20 is disposed adjacent the distal end of the inner leg of the edge guard, while rod 22 is disposed adjacent the distal end of the outer leg of the edge guard. In the installed edge guard, the rods are essentially directly across from each other.

According to principles of the invention, the wire rods 20 and 22 are magnetized so as to exert a magnetic attractive force for mounting on the metal door edge. A suitable material is any permanent magnet steel, for example, "Alnico."

The material of the edge guard body is of sufficient thickness and character to provide protection for the door edge and to also protect to a certain extent any object which may be present in the path of the swinging door edge. Accordingly, the edge guard thickness may be dimensioned to any of various possible thicknesses. Generally, the edge guard will retain its U-shaped cross section, but it may have a certain degree of pliability to allow it to fit onto the door edge. By making the nominal dimension across the throat of the edge guard less than the thickness of the door edge, the edge guard will expand slightly when fitted onto the trailing edge. By making the edge guard with a certain amount of flexibility, it can be conformed to various contours in the trailing edge, these being for example a simple sweep or a compound sweep.

Figure 3:
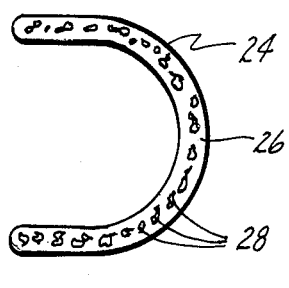
FIG. 3 is a view similar to FIG. 2 illustrating another embodiment of door edge guard according to the present invention, but shown by itself.

FIG. 3 illustrates a further embodiment of edge guard 24 containing a non-metallic body 26. The non-metallic body may be a plastic like that of the FIG. 2 embodiment. The magnetic medium contained within body 26 consists of a matrix of magnetized fragments, grains or dust 28. The illustrated construction shows the grains distributed throughout the extent of the edge guard. With this arrangement, the magnetic forces will be exerted around the U-shaped cross section.

Figure 4:
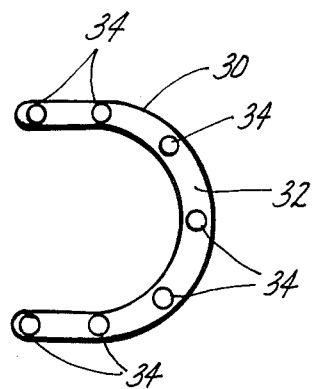
FIG. 4 is a view similar to FIG. 3 illustrating still another embodiment.

FIG. 4 illustrates another embodiment 30 which is shown to comprise a number of magnetic wires or rods 34 within a non-metallic body 32. The illustrated example shows there to be seven wire rods arranged at generally uniform intervals around the U-shaped cross section. The rods extend the full length of the edge guard. Where the edge guards are constructed by an extrusion process, an edge guard is cut to a desired length from the extruded material. This may leave the ends of the wire rods exposed to view and it is possible to conceal them, if desired, by painting or any other type of medium being applied to the cut longitudinal ends of the edge guards. However where the wire rods are of small diameter, this may not be mandatory.

The preferred fabrication procedure comprises magnetizing the magnetic material after the edge guard has been extruded. Because elevated temperatures are used to extrude non-metallic plastic onto the metal, such heat might have a deteriorating effect on the quality of a previously magnetized material. Therefore, magnetizing is preferably conducted after the extrusion by placing the edge guard in a suitable magnetizing device. However, where the non-metallic body is fabricated through procedures which do not adversely affect a magnetic material, it is entirely possible that the magnetizing may be done before the metal is encapsulated by the non-metallic material.

While a preferred embodiment of the invention has been disclosed, it will be appreciated that principles are applicable to other embodiments.

What is claimed is:

1. A door edge guard for the trailing edge of a swinging metal closure comprising an elongate non-metallic one-piece unitary body of generally U-shaped cross section having a generally semi-circular base with inner and outer legs extending from opposite ends of the base and containing a plurality of permanently magnetized elements for attaching the edge guard magnetically to the trailing edge of the swinging metal closure in which said plurality of permanently magnetized elements comprise wires running lengthwise of the non-metallic body and distributed around the U-shaped cross section at spaced apart intervals, each of said legs and base containing at least one of said wires and in which said wires and non-metallic body are so organized and arranged in the cross section that the wires occupy a substantial portion of the thickness of said non-metallic body, being just slightly less than the non-metallic body's thickness, but are fully encapsulated so that the interior and exterior surfaces of the cross section are non-metallic.

2. A door edge guard as set forth in claim 1 in which the throat across the edge guard between the distal ends of the legs is dimensioned slightly less than the thickness of the trailing edge of the swinging metal closure such that the non-metallic body is flexed slightly when fitted onto the trailing edge.

3. A door edge guard as set forth in claim 1 in which said plurality of permanently magnetized elements are magnetized after the non-metallic body has been formed around them.

4. A door edge guard as set forth in claim 3 in which said non-metallic body comprises a plastic.

5. A door edge guard as set forth in claim 4 in which the plastic is extruded onto said plurality of elements, said plurality of elements comprising a plurality of wires extending lengthwise of the non-metallic body.

6. A door edge guard for the trailing edge of a swinging metal closure comprising an elongate non-metallic one-piece unitary body of generally U-shaped cross section having a generally semi-circular base with inner and outer legs extending from opposite ends of the base and containing a plurality of permanently magnetized elements for attaching the edge guard magnetically to the trailing edge of the swinging metal closure in which said plurality of permanently magnetized elements comprise a plurality of metal fragments distributed as a matrix throughout the extent of the non-metallic body, including said legs and base.

7. A door edge guard as set forth in claim 6 in which said plurality of permanently magnetized elements are magnetized after the non-metallic body has been formed around them.

* * * * *